(12) United States Patent
Ruppert

(10) Patent No.: US 12,255,548 B2
(45) Date of Patent: Mar. 18, 2025

(54) METHOD FOR ACTIVELY DISCHARGING AN ELECTRICAL ENERGY STORAGE DEVICE, CONTROL DEVICE, ELECTRICAL CIRCUIT DEVICE AND MOTOR VEHICLE

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 401 days.

(21) Appl. No.: 18/053,725

(22) Filed: Nov. 8, 2022

(65) Prior Publication Data
US 2023/0143379 A1    May 11, 2023

(30) Foreign Application Priority Data
Nov. 9, 2021    (DE) .......................... 102021129145.3

(51) Int. Cl.
| | | |
|---|---|---|
| *H02M 7/5387* | (2007.01) | |
| *H02J 7/00* | (2006.01) | |
| *H02M 1/08* | (2006.01) | |
| *B60L 50/60* | (2019.01) | |
| *H02M 1/088* | (2006.01) | |

(52) U.S. Cl.
CPC ........... *H02M 7/5387* (2013.01); *H02J 7/005* (2020.01); *H02M 1/08* (2013.01); *B60L 50/60* (2019.02); *H02J 2207/20* (2020.01); *H02M 1/088* (2013.01)

(58) Field of Classification Search
CPC ....... H02M 7/5387; H02M 1/08; H02M 1/088
See application file for complete search history.

(56) References Cited

U.S. PATENT DOCUMENTS

| | | | |
|---|---|---|---|
| 2011/0080149 A1 | 4/2011 | Fukuta et al. | |
| 2011/0133546 A1* | 6/2011 | Jang ................. | H02M 7/53871 327/419 |

(Continued)

FOREIGN PATENT DOCUMENTS

| | | |
|---|---|---|
| DE | 102014200311 A1 | 7/2015 |
| DE | 102016207373 A1 | 11/2017 |

(Continued)

*Primary Examiner* — Gary A Nash
(74) *Attorney, Agent, or Firm* — Seed IP Law Group LLP

(57) ABSTRACT

A method for actively discharging an electrical energy storage device by means of an electrical circuit arrangement which comprises at least one half bridge comprising two switching elements, wherein the half bridge is connected in parallel with the energy storage device and wherein the switching elements each have a switchable section, the electrical resistance of which can be set in a transmission mode of the switching element by means of a control voltage of the switching element, wherein, in order to discharge the energy storage device, the level of the control voltages of the switchable sections of the switching elements in transmission mode and/or the ratio between a switched-on duration in which the switchable sections of the switching elements are operated in transmission mode during the discharge, and a switched-off duration in which the switchable sections of the switching elements are operated in a blocking mode during the discharge can be set as a function of a discharge current specification describing the level of a discharge current of the energy storage device.

18 Claims, 3 Drawing Sheets

(56) References Cited

U.S. PATENT DOCUMENTS

| | | | |
|---|---|---|---|
| 2013/0033914 A1* | 2/2013 | Yahata | H02M 7/48 |
| | | | 363/132 |
| 2015/0239363 A1* | 8/2015 | Brockerhoff | H02J 7/1492 |
| | | | 320/164 |
| 2015/0280611 A1 | 10/2015 | Kusumoto et al. | |
| 2018/0065489 A1* | 3/2018 | Zhou | B60L 3/003 |
| 2019/0260286 A1* | 8/2019 | Appel | H02M 7/219 |
| 2019/0296634 A1 | 9/2019 | Ikeda | |
| 2019/0379225 A1* | 12/2019 | Ruppert | B60L 55/00 |
| 2020/0006965 A1* | 1/2020 | Edelhäuser | H02J 7/0031 |
| 2020/0067400 A1* | 2/2020 | Li | H02M 1/4216 |

FOREIGN PATENT DOCUMENTS

| | | |
|---|---|---|
| DE | 102017121579 A1 | 3/2018 |
| DE | 102018202661 A1 | 8/2019 |
| EP | 2475085 A1 | 7/2012 |

\* cited by examiner

METHOD FOR ACTIVELY DISCHARGING AN ELECTRICAL ENERGY STORAGE DEVICE, CONTROL DEVICE, ELECTRICAL CIRCUIT DEVICE AND MOTOR VEHICLE

BACKGROUND

Technical Field

Embodiments of the invention relate to a method for actively discharging an electrical energy storage device by means of an electrical circuit arrangement. Moreover, embodiments of the invention relate to a control device, an electrical circuit device, and a motor vehicle.

Description of the Related Art

A function for actively discharging an electrical energy storage device may be necessary, for example, for direct current link capacitors in traction networks of electric or hybrid vehicles. There, one or more direct current link capacitors are arranged between a traction battery and an inverter for operating an electric motor. Traction networks of this type are usually designed as high-voltage on-board power supplies, which have voltages of more than 60 V. At such voltages, fast and reliable discharge of the direct current link capacitor is necessary, for example, when the motor vehicle is taken out of service or in the event of a fault that requires the motor vehicle or its on-board network to be shut down. In addition to motor vehicles, the need to discharge an electrical energy storage device can also occur in other devices.

One known possibility for achieving active discharging consists in connecting a resistive load in parallel to the energy storage device, by means of which the energy stored in the energy storage device is converted into heat. However, such a solution has the disadvantage that, on one hand, an additional discharge circuit is necessary, and, on the other hand, there are significant challenges as regards the design of the load, since the currents occurring during discharge can be very large and the heat that is thereby generated in the resistor must be dissipated efficiently within a short time period.

Another known possibility for discharging a direct current link capacitor is to discharge it by means of a half bridge of an inverter. To achieve this, a short-term short-circuit is created by means of the two switches. This short circuit reduces the voltage and thus also the energy in the direct current link capacitor. The energy stored in the direct current link capacitor is converted into heat in the half bridge or in the two switches forming the half bridge. Methods of this type are described, for example, in DE 10 2016 207 373 A1, DE 10 2017 121 579 A1 and DE 10 2018 202 661 A1.

EP 2 475 085 A1 describes a method in which a gate voltage of a switching element is reduced before the charging of a direct current link capacitor, which capacitor is arranged in a direct current link connected to an inverter comprising the switching element. As a result, the current fed into the capacitor for charging can be reduced.

US 2019/0296634 A1 describes an electrical circuit arrangement that is used to detect voltage overshoots and/or surge voltages in a high-voltage network. Depending on the detected overvoltage, the switching speed is adjusted by charging or alternatively discharging a gate capacitance of the switching elements.

In US 2015/0280611 A1, an electrical circuit arrangement with a direct current link capacitor and an inverter is described. For active discharging of the direct current link capacitor, a discharge circuit is provided which comprises a switch and a load and which is connected in parallel with the direct current link capacitor.

BRIEF SUMMARY

Some embodiments provide an improved method for actively discharging an electrical energy storage device by means of an electrical circuit arrangement which, in particular, reduces the load on the components of the electrical circuit arrangement during discharge.

Some embodiments provide a method for actively discharging an electrical energy storage device by means of an electrical circuit arrangement which comprises at least one half bridge consisting of two switching elements, wherein the half bridge is connected in parallel with the energy storage device and wherein the switching elements each have a switchable section, the electrical resistance of which can be adjusted in a transmission mode of the switching element by means of a control voltage of the switching element. Other embodiments provide a control device, an electrical circuit device, and a motor vehicle.

In some embodiments, in a method of the type mentioned here above, in order to discharge the energy storage device, the level of the control voltages of the switchable sections of the switching elements in the on mode and/or the ratio between a switched-on duration in which the switchable sections of the switching elements are operated in the transmission mode during discharge and a switched-off duration in which the switchable sections of the switching elements are operated in a blocking mode during discharge are set as a function of a discharge current specification describing the level of a discharge current of the energy storage device.

The resistance of the switchable section of the switching elements can be adjusted by the height of the control voltages in transmission mode. Thus, an amperage of a discharge current with which the electrical energy storage device is discharged may be prescribed, since this depends not only on the voltage of the electrical energy storage device but also on the resistance of the switching elements by means of which the energy storage device is discharged. The switching elements, which form the at least one half bridge, are designed, in each case, in particular, as a transistor. To set the level of the resistances of the switchable paths in transmission mode, the control voltages of the switching elements of the half bridges can, in particular, each be set to a level between a threshold voltage and a maximum permissible switched-on voltage of the respective switching element.

Depending on the level of the discharge current which is to flow according to the discharge current specification during active discharge of the energy storage device, a change in the ratio between a switched-on duration and a switched-off duration can additionally or alternatively also be adapted during pulse operation of the switching elements. The switched-on duration describes the time during which the switching element is operated in transmission mode, which is to say during which a significant flow of current takes place through the switchable section, and the switched-off duration describes the time during which the switchable path of the switching element is operated in blocking mode, which is to say during which no significant flow of current occurs by means of the switching element.

The level of a discharge current may, for example, refer to the temporal average of a flow of current which results from the pulse operation of the switching elements. This temporal average can be adjusted by a variation of the ratio between the switched-on duration and the switched-off duration of the switching elements of the at least one half bridge. In pulse mode, it is also possible to set a resistance of the switchable path of the switching elements during the respective switched-on duration in order to limit the flow of current in the switched-on phases of the at least one half bridge.

Both the setting of defined resistances for the switchable path of the switching elements and the adjustment of the ratio between the switched-on duration and the switched-off duration during pulsed operation of the switching elements make it possible to reduce the load on the switching elements during active discharging. A lesser amperage which flows through the switching elements results in lesser heating of these switching elements. The changing of the ratio between the switched-on duration and the switched-off duration thereby enables a better heat transfer from the switching elements to a cooler associated with the electrical circuit arrangement, since there is no heat generation in the switching elements during the off phases.

Compared to discharging the energy storage device in continuous or pulsed operation of short-circuited switching elements, there is the advantage that the flowing discharge current does not correspond to the short-circuit current and therefore only a lesser heat is generated in the semiconductor components. The discharge currents that are set and/or the ratios between the switched-on duration and the switched-off duration that are set can be selected, for example, in such a way that the temperatures of the switching elements remain below a critical value, for example, below a junction temperature of 200° C. The component stress of the switching elements as well as of the component stress of an energy storage device designed, for example, as a capacitor can be reduced by reducing the discharge current. This allows the service life of the components to be increased and wear of the components ascribable to active discharging of the energy storage device can be avoided.

The occurrence of very high temperature gradients, as is the case with a high short-circuit current, can thus be avoided. When the switching elements are switched off, a reduction in the discharge current can also reduce a voltage overshoot at the switching elements, which also leads to a reduction in component stress. A reduction in component stress has the advantage that switching elements designed, for example, as semiconductor components can be designed with a smaller semiconductor surface, since the lower loads during active discharging allow for a less robust design of the semiconductors. Over-dimensioning of the semiconductor components to ensure the required service life of the components can thus be dispensed with. Furthermore, a reduction in manufacturing costs can be achieved due to the lower material requirements.

The setting of defined resistances in the switching elements, or the adaptation of the duty ratio between switched-on duration and switched-off duration, further enables a defined discharge process in which a defined discharge current flows and in which, accordingly, a defined and more limited power input in the switching elements can thus be generated. Furthermore, by selecting the desired discharge current, the time duration required to completely discharge the energy storage device can also be set, such that different discharge rates of the energy storage device can be achieved for different scenarios. By way of example, the energy storage device can be discharged within 10 seconds or less, such as within 5 seconds, or within one second or less.

Active discharging of the energy storage device describes a discharging process in which the energy storage device is discharged completely or at least almost completely within a defined period of time. Active discharging thus represents a method, the goal of which is to discharge the energy storage device and thus does not include discharging the energy storage device, which can occur during operation of a device connected to the electrical circuit arrangement, for example, an electrical motor. The active discharging can, in particular, be carried out when the electrical circuit arrangement is switched off in order to transfer it to a defined and safe state.

When the method described herein is used in an electrical circuit arrangement which is frequently switched on and off, a load on the components can be significantly improved by using a reduced current compared to a short-circuit current. It can, in particular, be implemented in functions in which the discharge of the energy storage device is not time-critical, for example, in the case of discharge of the energy storage device as a result of a regular switching-off of the electrical circuit arrangement or alternatively of a device comprising the electrical circuit arrangement. The method can thus be used in an electrical circuit arrangement of a motor vehicle, in particular a traction network of a motor vehicle, since in motor vehicles a high number of cycles of switching-off operations can occur over the service life of the vehicle, for example, after the motor vehicle has been parked.

It can be provided that the levels of the control voltages and/or the ratio between the switched-on duration and the switched-off duration during the discharge are set, in particular regulated, as a function of at least one measured variable describing the discharge current and/or a voltage of the energy storage device. A regulation can be performed on the discharge current of the energy storage device, which is often already measured for other purposes. In particular, a regulation of the resistance of the switchable paths by means of the control voltages, or regulation of the ratio between the switched-on duration and the switched-off duration, makes it possible to directly take into account a drop in voltage of the energy storage device by means of the measurement of the voltage or indirectly by means of a measurement of the current when setting the desired discharge current.

In so doing, an active control of the control voltages can be used. For this purpose, the control voltages can be generated variably within a predetermined interval by a control device designed specifically for carrying out the process. In this way, the switching elements can be controlled with different control voltages and thus with different resistances of the switchable paths. For this purpose, the control device can in particular be connected to a measuring means which measures the metrics describing a discharge current of the energy storage device and/or a voltage of the energy storage device, such that a regulation of the control voltage to one of these variables is made possible.

In some embodiments, it can be provided that a constant discharge current during discharge is specified by means of the discharge current specification. For this purpose, for example, the control voltages are continuously increased during discharging such that the electrical resistances of the switchable paths are reduced. Due to the drop in the voltage of the energy storage device resulting from the discharging of the energy storage device, a constant flow of current is thus obtained. A constant flow of current can also result from the fact that several half bridges are used for discharging the energy storage device, whereby a constant flow of current can also result during pulse operation of two or more half bridges connected in parallel to the energy storage device by adjusting the switched-on durations and/or switched-off durations of the switching elements of the respective half bridges.

The specification of a constant charging current by means of the discharge current specification and the corresponding adjustment of the resistances of the switchable paths, or of the ratio between the switched-on duration and the switched-off duration of the respective switching elements, enables a linear or constant discharge of the energy storage device. This avoids that the discharge curve of the energy storage device drops very slowly at the end, which can, in particular, occur when using a constant resistance for discharging the energy storage device. By using a discharge current specification describing a constant discharge current, it is possible to specify the time window in which the discharge of the energy storage device leads to an energy storage device voltage below a specified voltage value, in particular to a voltage lower than 60 V or to a shockproof low voltage.

It can be provided that the level of the constant discharge current is specified as a function of the information relating to the degradation describing the age and/or degradation of the switching elements, in particular, it can be provided that a lower level of the discharge current is specified with increasing age and/or increasing degradation. This makes it possible to specify a lower level of a discharge current as a function of the age and/or degradation of the switching elements, such that a desired service life of the switching elements can be ensured. When compared with discharging by at least brief and/or pulse-like short-circuiting of the energy storage device, a significant increase in the service life of the switching elements and/or the energy storage device can thus be achieved.

The degradation information can, for example, describe the age of the switching elements, which is to say, for example, the time that has elapsed since the electrical circuit arrangement was assembled. The degradation of the switching elements can describe, for example, the operating time up until the present time of the switching elements, which is to say, the duration during which the electrical circuit arrangement was switched on and/or operated. The dependency of the discharge current on the age and/or degradation can, for example, occur gradually on the basis of different age levels and/or degradation levels. A continuous correlation of a level of the discharge current to an age and/or a degradation by means of a rule of correlation is also possible.

The determination of the degradation information and/or the determination of the constant discharge current as a function of the degradation information can, for example, be carried out by a control device designed to carry out the method. This control device can also contain the degradation information or track and store the ongoing degradation of the switching elements.

It can be provided that an electrical circuit arrangement with a plurality of half bridges, each connected in parallel to the energy storage device, in particular an electrical circuit arrangement designed as a multiphase pulse inverter, is used. For example, the energy storage device can be connected to a direct current side of the inverter. The alternating current side of the inverter can, for example, be used to supply current to an electric motor of the electric circuit arrangement.

It can be provided that during the discharge of the energy storage device, the switchable paths of the switching elements of a plurality of half bridges are each switched in a pulse mode between a blocking mode and a transmission mode. Pulsed operation of the switching elements of several of the half bridges can ensure that the power dissipated in the semiconductors, or the heat generated there during discharge of the energy storage device can be dissipated more effectively into a cooler associated with the electrical circuit.

The pulse pauses that occur in the pulse mode ensure that the heat loss from the semiconductor chips forming the switching elements is transferred to the cooler, since the thermal mass of the chip is very limited. Discharging by means of several time-delayed phases or even at the same time is not desirable without pulsed operation of the several half bridges, since the short-circuit current would become too large and could significantly increase the component stress in the power semiconductors as well as in the energy storage device. Through the use of pulsed operation, a reduction of the heating of the switching elements can be achieved and damage or excessive stress of the switching elements can be avoided due to low thermal mass thereof. It can also be achieved that the temperatures of the switching elements remain below a critical value, for example, below a junction temperature of 200° C., since enough time for the heat transfer to a cooler is provided by the switched-off phases.

Furthermore, in the event of a defect in one of the half bridges, which puts it permanently into a non-conducting state, it is still possible to discharge the energy storage device by changing the half bridges used for discharging. Furthermore, the half bridges are uniformly stressed, in particular when all half bridges are used for discharging, such that there is no excessive wear of a single half bridge. The half bridges may be operated in such a way that their respective switching elements are switched on for at least substantially the same time during a discharge process.

In some embodiments, it can be provided that, as a function of the level of the discharge current during the discharge, the ratios between the switched-on duration and the switched-off duration for the switching elements of a plurality of half bridges are set in such a way that the switching elements of exactly one of the half bridges are cyclically alternatingly switched in transmission mode or that cyclically the switching elements of at least two of the half bridges are, at least secondarily, simultaneously switched in transmission mode.

Depending on the level of the discharge current to be set, two different scenarios can thus be achieved. In the first scenario, there is alternatingly precisely one of the half bridges that is always switched to conductive mode, wherein cyclical switching between the several half bridges takes place. In this way, a uniform utilization of the switching elements of the half bridges is achieved, whereby the component stress in the individual switching elements can be minimized.

In order to achieve larger discharge currents or alternatively shorter discharge times, it can be provided in a second scenario that at least two of the half bridges are conductively connected simultaneously, such that, due to the parallel connection, a larger discharge current can be realized without having to flow larger currents in the switching elements themselves. Moreover, the two or more half bridges that are, in each case, conductively connected can be alternated in a cyclical manner, such that, here too, there is respectively a more uniform load on the half bridges used for discharging.

It can be provided that, when a maximum discharge current is specified, the switching elements of at least two of the half bridges are simultaneously at least temporarily cyclically switched in transmission mode, wherein the smallest possible resistances are set in transmission mode by means of the control voltages. A specification of a maximum discharge current can, for example, take place in the rapid discharge of the energy storage unit in the event of an emergency. In so doing, the control voltage of the switching elements can be switched to the maximum permissible control voltage, for example, a maximum permissible gate-source voltage or a maximum permissible base-emitter voltage. In this way, the smallest possible resistances are set in the forward mode of the switching elements and, together with the at least temporary parallel operation of two or more half-bridges in the switched-on state, the fastest possible discharge of the energy store can be achieved.

Such a method of rapid discharge for emergency purposes can, in particular, be selected if it is a case of an unscheduled shutdown or shutdown due to a fault or malfunction in the electrical circuit arrangement or alternatively of a device comprising the electrical circuit arrangement. In this case, an increased load on the components can be accepted, since these are individual cases and not processes with an expected high number of cycles, as is the case, for example, with a regular shutdown of the electrical circuit arrangement. Furthermore, through the provision of a function for rapid discharge, it can be achieved that the energy storage device is discharged as quickly as possible and that the electrical circuit arrangement can thereby also be put into a defined, safe state as quickly as possible.

Transistors, in particular metal-oxide-semiconductor field-effect transistors made of silicon carbide, can be used as switching elements herein. Switching elements designed as MOSFETs or SiC-MOSFETs hereby offer the advantage that their channel resistance, which is to say the resistance of their switchable drain-source path, can be set to almost any resistance value by means of the switched-on voltage, which is to say the gate-source voltage of the respective switching element. It is possible, for example, that the gate-source switched-on voltage can be actively controlled by a control device, as described above, to set the resistance of the drain-source path of the switching elements designed as MOSFETs. In particular, a gate-source voltage which is greater than the threshold voltage of the semiconductor, for example, greater than 5 V, and less than a maximum permissible voltage of the switching element, for example, less than 15 V or 18 V, can be selected for switching on the switching elements.

In some embodiments, it may be provided that a direct current link capacitor of a high-voltage network, in particular with a voltage between 250 V and 1500 V, is used as the energy storage device. The high-voltage network can, in particular, be a traction network of a motor vehicle, by means of which it is possible to supply current to a traction electric motor of the motor vehicle. In this, the electrical circuit arrangement can be designed as an inverter circuit, which enables the motor to be supplied with current during normal operation of the electrical circuit arrangement.

For a control device as described herein, it is provided that it is designed to generate the control voltages for at least two switching elements of at least one half bridge of an electrical circuit arrangement which can be connected or is connected to the control device, wherein the control device is set up to carry out a method as described herein.

The control device is consequently set up to bring about an adaptation of the control voltages of the switching elements and/or of the ratio of a switched-on duration to a switched-off duration of the switching elements as a function of a discharge current specification which describes the level of a discharge current of the energy storage device. In particular, the control device can be set up to also accordingly operate an electrical circuit arrangement, in particular a three-phase inverter, such that it can, in each case, accordingly, generate the control voltages for at least six switching elements. This can be achieved by actively regulating the control voltages of the switching elements.

It is provided for an electrical circuit device as described herein that the same comprises a control device as described herein, an electrical energy storage device and an electrical circuit arrangement with at least one half bridge comprising two switching elements, wherein the half bridge is connected in parallel with the energy storage device and the switching elements respectively having a switchable section the resistance of which can be set by means of a control voltage of the switching element.

For a motor vehicle as described herein, it is provided that it comprises an electrical circuit device as described herein.

In particular, the electrical circuit device can form part of an on-board traction network of the motor vehicle. The electrical energy storage device may be a direct current link capacitor which is arranged in a DC intermediate circuit of the on-board traction network.

All of the advantages and embodiments described above with respect to methods apply accordingly to control devices, electrical circuit devices, and motor vehicles. The advantages and embodiments described with respect to control devices, electrical circuit devices, and motor vehicles also apply correspondingly to the respective other devices described herein and to the methods described herein.

BRIEF DESCRIPTION OF THE SEVERAL VIEWS OF THE DRAWINGS

Further advantages and embodiments are described below and illustrated in the drawings.

DETAILED DESCRIPTION

Figure 1:
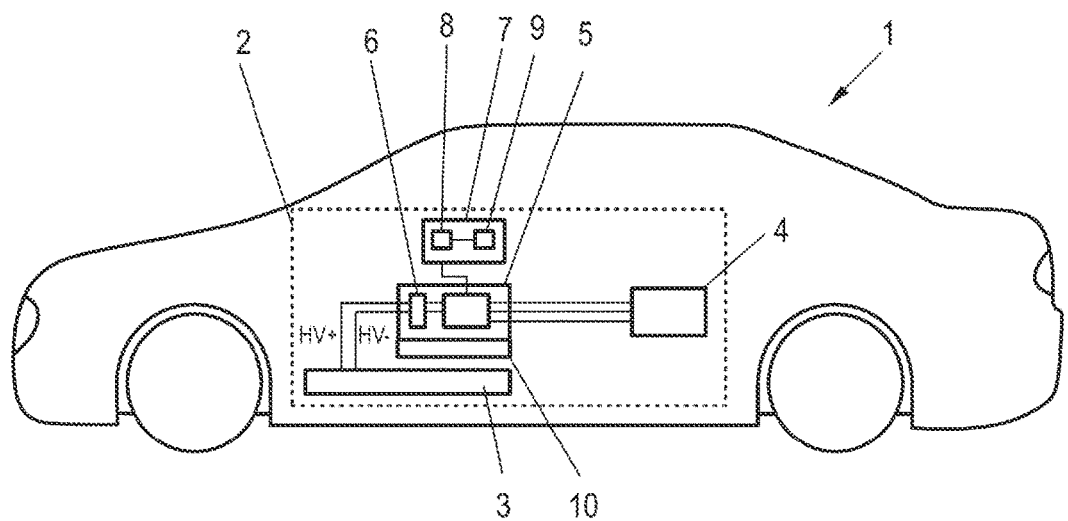
FIG. 1 shows an example of a motor vehicle, comprising an electrical circuit device with a control device.

FIG. 1 shows an embodiment of a motor vehicle 1. The motor vehicle 1 comprises an electrical circuit device 2. The electrical circuit device 2 forms a high-voltage electrical system of the motor vehicle 1 and comprises a traction energy storage unit 3, an electric traction motor 4 and an electrical circuit arrangement 5 designed as a three-phase pulse inverter.

A direct current taken from the traction energy storage unit 3 can be converted by the circuit arrangement 5 into a three-phase alternating current for driving the electric traction motor 4. It is also possible to convert an alternating current generated by means of the traction motor 4 in generator operation into a direct current for charging the energy storage device. The structure of the electrical circuit arrangement 5 is described in more detail below with reference to FIG. 2.

The electric circuit device 2 further comprises an energy storage device 6 designed as a direct current link capacitor, which is connected between the voltage levels HV+ and HV− of the electric traction energy storage device 3. The energy storage device 6 therefore represents a direct current link capacitor or an X-capacitor.

The electrical circuit device 2 moreover comprises a control device 7, which comprises a driver circuit 8 and a control unit 9. The driver circuit 8 of the control device 7 may be spatially contained inside the circuit arrangement 5, for example, by arranging the driver circuit 8 within a housing of the circuit arrangement 5. The control device 9 may also be arranged in the housing or it may be implemented separately and connected to the driver circuit 8. For discharging the energy storage device 6, the traction energy storage device 3 can be decoupled, for example, by means of a switching device (not shown here), so that when the energy storage device 6 is discharged, the traction energy storage device 3 is not also discharged.

The electrical circuit arrangement 5 is assigned a cooling device 10, by means of which heat generated during operation of the circuit arrangement 5, in particular heat generated in switching elements of the circuit arrangement 5, can be dissipated. The cooling device 10 can, for example, be a heat sink and in particular be connected or thermally coupled to a cooling circuit (not shown here) of the motor vehicle 1.

In a normal operation of the electrical circuit arrangement 5, for example, motor operation or generator operation of the traction motor 4, the control terminals of the switching elements $S_i$ are driven by the control device 7 with a control voltage alternating between the switched-off voltage and the maximum switched-on voltage. In this case, the control can, in particular, be performed by means of pulse width modulation (PWM). Moreover, the control device 7 can control the electrical circuit arrangement 5 for active discharging of the energy storage device 6, as will be described in more detail below.

An active discharging of the energy storage device 6 may be necessary if, for example, the electrical circuit device 2 and/or the motor vehicle 1 has been switched off, for example, as a result of a termination of operation such as switching off after the motor vehicle has been parked or comparable processes. Furthermore, an active discharge may be required as a rapid discharge, for example, upon the occurrence of a fault condition in the electrical circuit arrangement 5 and/or in the motor vehicle 1, as will be explained in more detail below.

A high-voltage tension can be provided by the traction energy storage device 3 for operating the electrical circuit device 2. This high-voltage tension can, for example, be between 250 V and 1500 V, in particular between 360 V and 860 V. During operation of the electrical circuit device 2 or of the motor vehicle 1, the energy storage device 6, which is designed as a direct current link capacitor, has a voltage UE which corresponds to the voltage of the high-voltage vehicle electrical system or of the traction energy storage device 3. This means that a high voltage is present at the energy storage device 6, which must be reduced when the electrical circuit device 2 or the motor vehicle 1 is switched off, for example, to ensure that the circuit device 2 or individual components thereof are safe to touch. In this way, functional safety and protection against contact with the components of the motor vehicle 1 are also ensured. This active discharging of the energy storage device 6 can be carried out by the electrical circuit arrangement 5, as will be described in more detail below.

Figure 2:
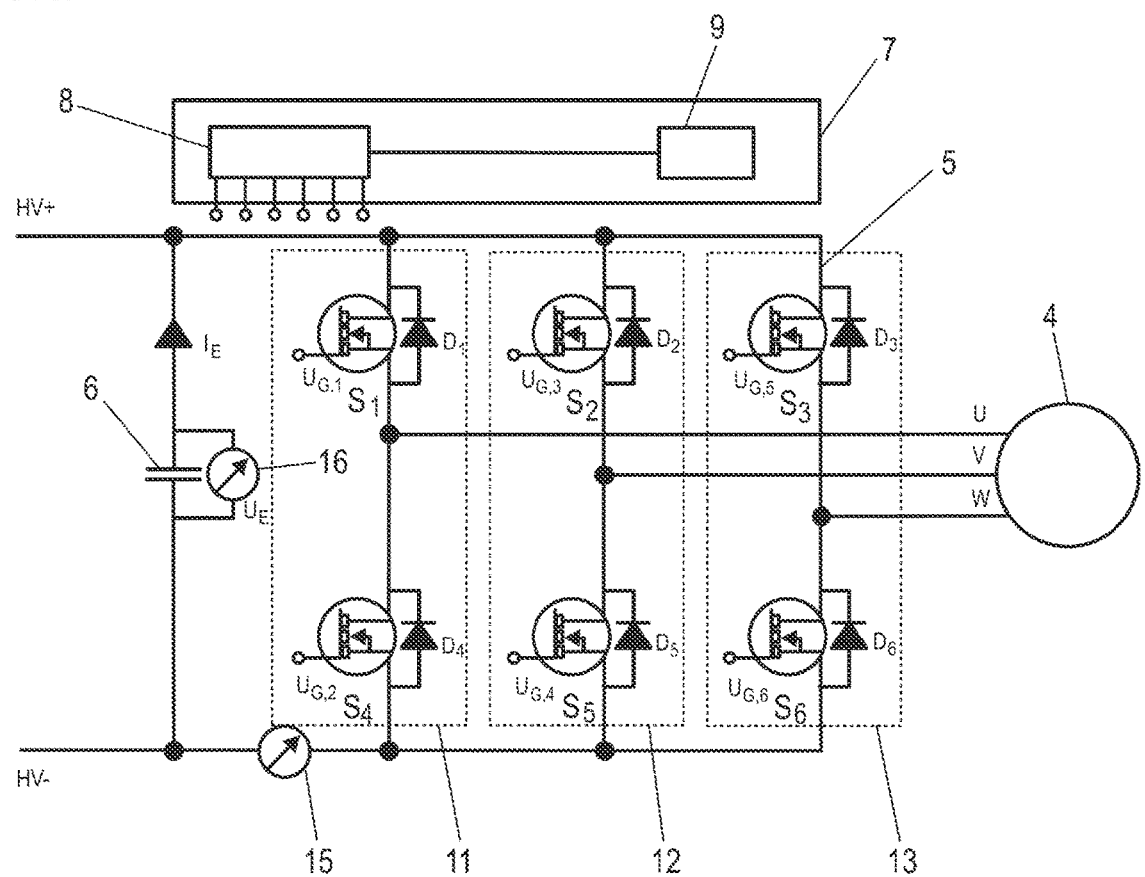
FIG. 2 shows a detailed view of an electrical circuit device.

FIG. 2 shows a detailed view of the circuit device 2 with the electrical circuit arrangement 5 designed as a three-phase pulse inverter. Also shown are the control device 7 and the electric traction motor 4 connected to the electric circuit arrangement 5.

The electrical circuit arrangement 5 comprises three half bridges 11, 12, 13, which are each formed by two of a total of six switching elements $S_1$ to $S_6$ of the circuit arrangement 5. In a normal driving operation of the motor vehicle 1, the direct current provided by the traction energy storage device 3 is converted by means of the half bridges 11, 12, 13, into a three-phase alternating current with the phases U, V and W for operating the electric traction motor 4. Moreover, the electrical circuit arrangement 5 can be used to discharge the energy storage device 6. For this purpose, a control voltage $U_{G,i}$ is applied to the control terminals of the switching elements $S_1$ to $S_6$ of at least one of the half bridges 11, 12, 13, wherein the magnitude of the control voltages $U_{G,i}$ is, in each case, between a threshold voltage $U_{th,i}$ and a maximum permissible switched-on voltage $U_{G,i\_max}$ of the respective switching element $S_i$.

The switching elements $S_1$ to $S_6$ each comprise a switchable section, wherein the switchable sections of two switching elements of a half bridge are respectively connected in series. The energy storage device 6 can be discharged by adjusting the control voltage $U_{G,i}$ of at least two of the switching elements, for example, the control voltages $U_{G,i}$ and $U_{G,4}$ of the switching elements $S_1$ and $S_4$ of the first half bridge 11. The respective electrical resistance of the switchable section of the switching element $S_i$ can be adjusted by the control voltage $U_{G,i}$ of the respective switching elements $S_i$. The control voltages $U_{G,i}$ of the switching elements $S_1$ to $S_6$ can be set by means of the driver circuit 8 of the control device 7 as specified by the control device 9. The connections between the driver circuit 8 and the respective control terminals of the switching elements $S_1$ to $S_6$ are not shown for reasons of clarity.

Figure 3:
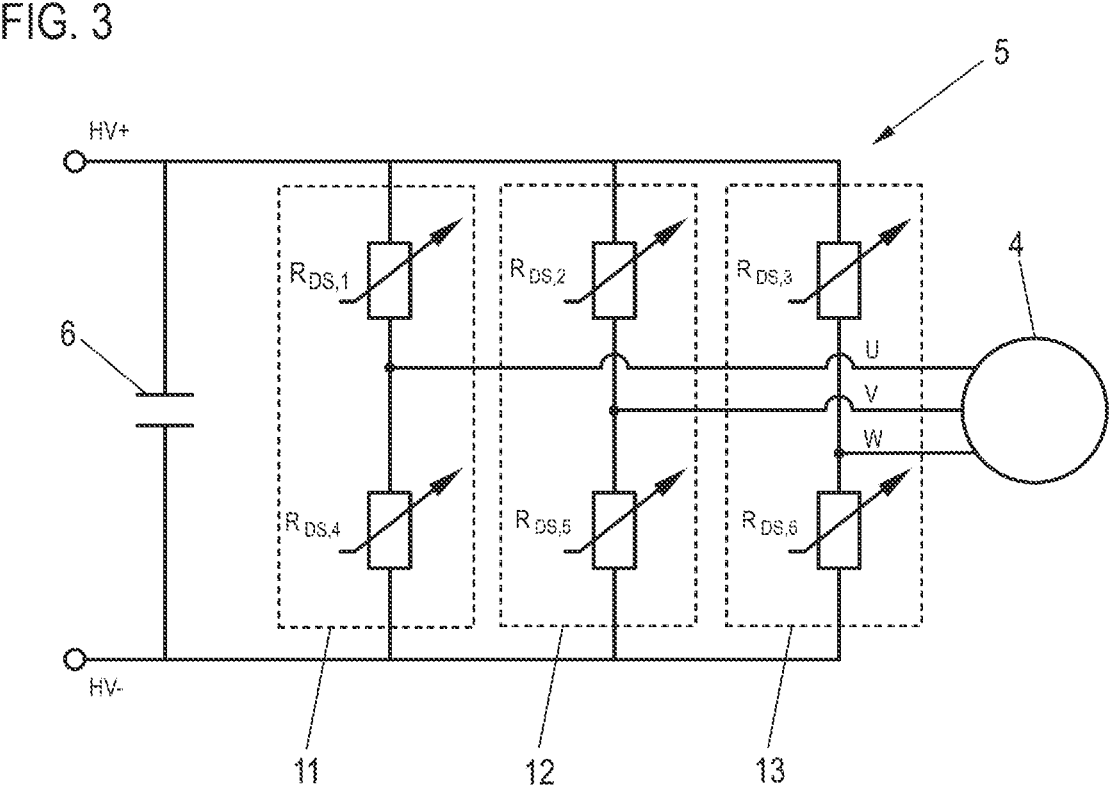
FIG. 3 shows a resistor-equivalent circuit diagram of an electrical circuit arrangement used for discharging an energy storage device.

If the three half bridges 11, 12, 13 are used to discharge the energy storage device 6, the resistance equivalent circuit of the electrical circuit arrangement 5 shown in FIG. 3 results for the discharge of the energy storage device 6. The resistance $R_{DS,i}$ respectively designates the electrical resistance of the switchable section of the switching elements $S_1$-$S_6$. However, the half bridges 11, 12, 13 do not need to be simultaneously and permanently in a conductive state. The switching elements $S_1$-$S_6$ can, in particular, also be operated in a pulse mode between a switched-on state and a switched-off state by means of their control voltages $U_{G,i}$, as explained in more detail below.

The switching elements $S_1$ to $S_6$ can, for example, be designed as metal-oxide-semiconductor field-effect transistors, in particular with silicon carbide base. Such SiC-MOSFETs can, for example, have a threshold voltage $U_{th}$ between 3 V and 5 V and a maximum permissible switched-on voltage $U_{G,i\_max}$ between 15 V and 18 V. The control voltages $U_{G,i}$ can accordingly be adapted by the control device 7 to switch the switching elements $S_1$-$S_6$ in a transmission mode. The control device 7 is, in particular, designed to dynamically adapt the control voltages $U_{G,i}$ of the switching elements $S_1$-$S_6$, in particular in the framework of a regulation. Moreover, the ratio between the switched-on duration and the switched-off duration and/or the absolute time durations of the respective switched-on intervals and the switched-off intervals can be adjusted by the control device 7 during pulse operation of the switching elements $S_1$-$S_6$.

This enables the electrical resistance of the switchable sections of the switching elements $S_1$-$S_6$, in this case the drain-source sections of the switching elements $S_1$-$S_6$, to be set in transmission mode as a function of a discharge current specification which describes the level of a discharge current IE to be set for the energy storage device 6 in a method for actively discharging the electrical energy storage device 6 by means of the control voltages $U_{G,i}$. Additionally, or alternatively, the ratios between the switched-on duration and the switched-off duration in a pulse operation of the individual switching elements $S_1$-$S_6$ can also be adjusted as a function of the discharge current $I_E$ that is to be set, which current is described by the discharge current specification.

The control device 7 can, in particular, regulate the level of the respective control voltages $U_{G,i}$ and/or the ratio between the switched-on duration and the switched-off duration during the active discharge of the energy storage device 6 as a function of at least one measured variable describing the discharge current. This makes it possible, for example, to set a constant discharge current $I_E$ during active discharging of the energy storage device 6. A measured variable describing the discharge current $I_E$ can be obtained directly by measuring the current of the branch of the inverter, which is at the potential HV, for example, by means of a current measuring means 15 arranged there. The use of such a current measuring means has the advantage that it can, in any case also be used in the regular operation of the circuit for the measurement and/or for the control of one of the phase currents in the phases U, V, W. Alternatively, the current measurement can also be performed in the branch of the inverter that is at potential HV+.

Additionally, or alternatively, a measurement of the energy storage device voltage $U_E$ can also be made by means of a voltage measuring means 16, wherein the control voltages $U_{G,i}$ can also be controlled as a function of the energy storage voltage $U_E$ in addition or alternatively to the measured value of the discharge current $I_E$. For this purpose, an assignment rule which assigns a resistance value of the switchable path of the respective switching element $S_i$ to the respective control voltages $U_{G,i}$ can, for example, be used, such that the discharge current $I_E$ results correspondingly from the energy storage device voltage $U_E$ and the resistances $R_{DS,i}$ of the conductively switched drain-source paths of the switching elements. The connections between the current measuring means 15, the voltage measuring means 16, and the control device 7 are not shown in FIG. 2 for reasons of clarity.

In this, the level of the constant discharge current can be specified as a function of degradation information describing the age and/or degradation of the switching elements $S_1$-$S_6$. In particular, with increasing age or increasing degradation, a lower level of the discharge current $I_E$ can be specified, so that the load on the switching elements during active discharging of the energy storage device 6 is reduced with increasing service life, this in order to be able to achieve a high overall service life of the switching elements $S_1$-$S_6$.

The degradation information can, for example, be stored in the control device 7 and can, for example, be determined by the control device 7 itself. The time which has elapsed since assembly of the circuit arrangement or since initial commissioning of the circuit arrangement 2, can, for example, be used as the age of the switching elements $S_1$-$S_6$. The cumulative operating time of the switching elements $S_1$-$S_6$ or comparable variables can, for example, be used as degradation information. The dependence of the discharge current IE on the age or degradation of the switching elements $S_1$-$S_6$ can be described, for example, by means of various stages of aging or degradation stages or in the continuous form of an assignment rule. The corresponding information can be stored, for example, in a memory device of the control device 7.

It is moreover possible that during the active discharge of the electrical energy storage device 6, the ratio between the switched-on duration and the switched-off duration of the switching elements $S_1$-$S_6$ is adjusted using one of the half bridges 11 to 13. In order to limit the heat input in the respective switching elements $S_1$-$S_6$, it can be provided that during the active discharge of the energy storage device 6, the switchable paths of the switching elements $S_1$-$S_6$ of several, in particular, of all three half bridges, are switched in a pulse mode between a blocking mode and a transmission mode. In so doing, in order to, for example, achieve a constant discharge current $I_E$, the ratios between switched-on durations and switched-off durations for the switching elements $S_1$-$S_6$ of a plurality of half bridges can be set in such a way that the switching elements $S_1$-$S_6$ of exactly one of the half bridges 11, 12, 13 are cyclically alternatingly switched in transmission mode. The switching patterns used for this purpose are shown, for example, in FIG. 4.

Figure 4:
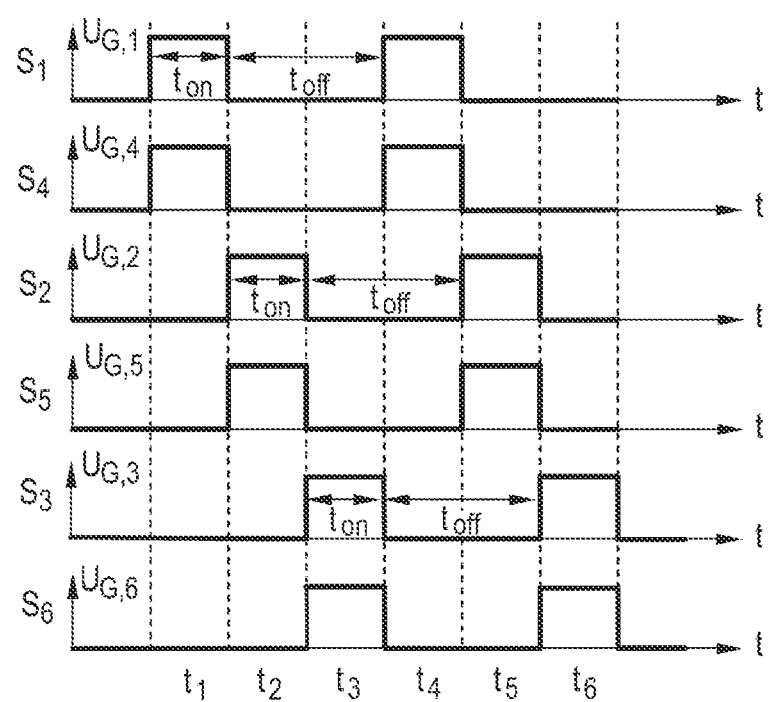
FIG. 4 shows a first diagram, in which the control voltages of the switching elements of the electrical circuit arrangement versus time are shown.

FIG. 4 shows a diagram in which the switched-on durations and the switched-off durations for the respective control voltages $U_{G,i}$ of the switching elements $S_1$-$S_6$ as a function of time t are represented. The course of the respective control voltages $U_{G,i}$ of the switching elements $S_1$-$S_6$ is shown one above the other in individual diagrams in order to make the position of the respective switched-on pulses relative to one another clear.

It is evident that the switching elements $S_1$ and $S_4$, which form the first half bridge 11, are operated simultaneously in transmission mode in a first time window $t_1$. Correspondingly, in a subsequent time window $t_2$, in which the switching elements $S_1$ and $S_4$ of the first half bridge 11 are operated in blocking mode, the switching elements $S_2$ and $S_5$ of the second half bridge 12 are operated in transmission mode. In a further time window $t_3$, in which both the switching elements of the first half bridge 11 and the second half bridge 12 are operated in blocking mode, the switching elements $S_3$ and $S_6$ of the third half bridge 13 are switched to transmission mode. Subsequently, the switching of the respective switching elements $S_1$-$S_6$ and the half bridges 11-13 is repeated cyclically, as shown for the time windows $t_4$ to $t_6$. The ratio between the switched-on duration $t_{on}$ and the switched-off duration $t_{off}$ of the switching elements $S_1$-$S_6$ is 1:2 or alternatively $t_{on}=0.5*t_{off}$.

In this manner, it can be achieved, that in the pulse pauses, which is to say during the switched-off phases of the individual switching elements $S_1$-$S_6$, a heat transfer takes place from the switching elements $S_1$-$S_6$ into the cooling device 10. Thus, a temperature of the switching elements $S_1$-$S_6$, for example, a junction temperature in the switching elements $S_1$-$S_6$, may once again decrease, such that the total heating of the switching elements $S_1$-$S_6$ occurring during the active discharge process can be limited, for example to a maximum junction temperature of 200° C. or less.

Figure 5:
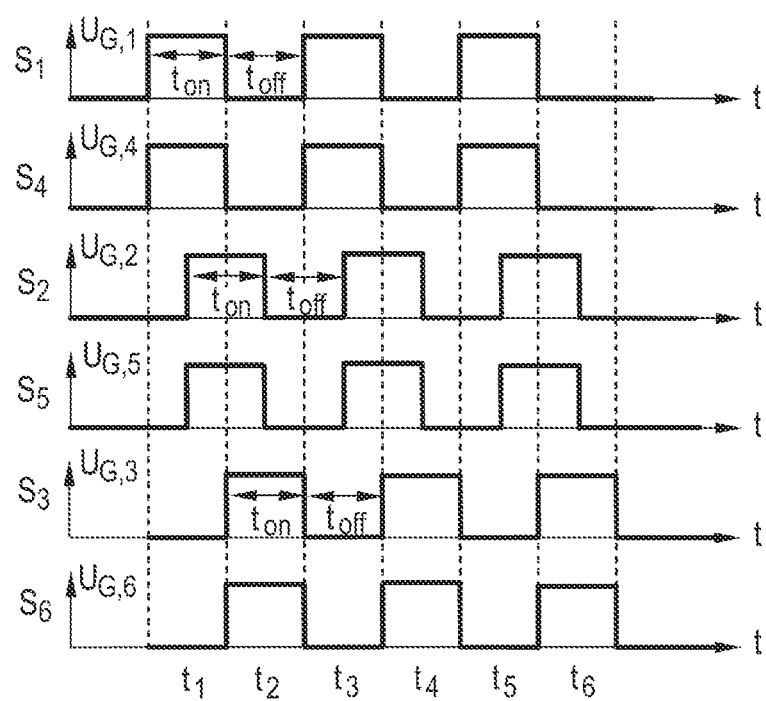
FIG. 5 shows a second diagram, in which the control voltages of the switching elements of the electrical circuit arrangement versus time are shown.

If a maximum level of the discharge current $I_E$ is specified by the discharge current specification, it can thus be provided that the switching elements $S_1$-$S_6$ of at least two of the half bridges 11 to 13 are cyclically at least temporarily simultaneously switched to transmission mode. To illustrate this process, the control voltages $U_{G,i}$ of the switching elements $S_1$-$S_6$ are shown in individual diagrams one above the other in FIG. 5. To achieve the maximum discharge current the control voltages $U_{G,i}$ of the switching elements $S_1$-$S_6$ are additionally set in such a way that the smallest possible resistances $R_{DS,i}$ are obtained in transmission mode of the switching elements $S_1$-$S_6$. This can, in particular, be achieved by the control voltage $U_{G,i}$ corresponding to the respective maximum permissible control voltage $U_{G,i,max}$ of the switching elements $S_1$-$S_6$.

It is evident that in part of the time window $t_1$ the switched-on phase of the switching elements $S_1$ and $S_4$ of the first half bridge 11 overlaps with the switched-on phase of the switching elements $S_2$ and $S_5$ of the second half bridge 12. The second half of the switched-on phase of the switching elements $S_2$ and $S_5$ of the second half bridge 12 correspondingly overlaps in part in the time window $t_1$ with the switched-on phase of the switching elements $S_3$ and $S_6$ of the third half bridge 13. Subsequently, at the beginning of the time window $t_3$, the switching elements $S_1$ and $S_4$ of the first half bridge 11 are switched on again without any further overlap, whereupon the switching pattern described above continues periodically. This enables a higher discharge current to be established due to the parallel switching on of several of the switching elements $S_1$ to $S_6$, or the at least temporarily conductive switching of at least two of the half bridges 11, 12, 13.

In such a scenario, it is not possible to regulate a constant charging current $I_E$ and, in particular, it is not absolutely necessary inasmuch as rapid discharging is only rarely carried out and then as an emergency measure. Compared with the normal operation for active discharge, which can take place, for example, during a process with a high number of cycles, such as switching off the electrical circuit arrangement 2 or the motor vehicle 1, such a rapid discharge represents an emergency measure, which can be carried out in response to a fault that has occurred in the electrical circuit arrangement 2 and/or in the motor vehicle 1. Such a rapid discharge may, for example, be performed if the motor vehicle 1 is involved in an accident. In this case, fault information describing the occurrence of the accident or another fault in the motor vehicle 1 can, for example, be transmitted to the control device 7, which correspondingly implements the rapid discharge by actuating the switching elements $S_1$-$S_6$.

German patent application no. 10 2021 129145.3, filed Nov. 9, 2021, to which this application claims priority, is hereby incorporated herein by reference in its entirety.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for actively discharging an electrical energy storage device using an electrical circuit arrangement including at least one half bridge comprising two switching elements, wherein the half bridge is connected in parallel with the energy storage device and wherein the switching elements each have a switchable section, the electrical resistance of which can be set in a transmission mode of the switching element by a control voltage of the switching element, the method comprising:

the level of the control voltages of the switchable sections of the switching elements in transmission mode and/or the ratio between a switched-on duration in which the switchable sections of the switching elements are operated in transmission mode during the discharge, and a switched-off duration in which the switchable sections of the switching elements are operated in a blocking mode during the discharge can be set as a function of a discharge current specification describing the level of a discharge current of the energy storage device.

2. The method according to claim 1, wherein the levels of the control voltages and/or the ratio between the switched-on duration and the switched-off duration during the discharge are set as a function of at least one measured variable describing the discharge current and/or a voltage of the energy storage device.

3. The method according to claim 1, wherein the levels of the control voltages and/or the ratio between the switched-on duration and the switched-off duration during the discharge are regulated as a function of at least one measured variable describing the discharge current and/or a voltage of the energy storage device.

4. The method according to claim 1, wherein a constant discharge current is specified during discharging by the discharge current specification.

5. The method according to claim 4, wherein the level of the constant discharge current is specified as a function of degradation information describing the age and/or degradation of the switching elements.

6. The method according to claim 4, wherein the level of the constant discharge current is specified as a function of degradation information describing the age and/or degradation of the switching elements, in that a lower level of the discharge current is specified with increasing age and/or increasing degradation.

7. The method according to claim 1, wherein an electrical circuit arrangement with a plurality of half bridges, each connected in parallel to the energy storage device is used.

8. The method according to claim 7, wherein the electrical circuit arrangement is designed as a multiphase pulse inverter.

9. The method according to claim 7, wherein, during the discharge of the energy storage device, the switchable paths of the switching elements of a plurality of half bridges are each switched in a pulse mode between a blocking mode and a transmission mode.

10. The method according to claim 9, wherein, as a function of the level of the discharge current during the discharge, the ratios between the switched-on duration and the switched-off duration for the switching elements of a plurality of the half bridges are set in such a way that the switching elements of exactly one of the half bridges are cyclically alternately switched in the transmission mode, or that cyclically the switching elements of at least two of the half bridges are, at least temporarily, simultaneously switched in the transmission mode.

11. The method according to claim 10, wherein, when a maximum discharge current is specified, the switching elements of at least two of the half bridges are simultaneously at least temporarily cyclically switched in transmission mode, wherein the smallest possible resistances are set in transmission mode by the control voltages.

12. The method according to claim 1, wherein transistors are used as switching elements.

13. The method according to claim 12, wherein the transistors used as the switching elements are metal-oxide-semiconductor field-effect transistors made of silicon carbide.

14. A method according to claim 1, wherein a direct current link capacitor of a high-voltage network is used as the energy storage device.

15. A method according to claim 1, wherein a direct current link capacitor of a high-voltage network, with a voltage between 250 V and 1500 V, is used as the energy storage device.

16. A control device which is designed to generate the control voltages for at least two switching elements of at least one half bridge of an electrical circuit arrangement which can be connected or is connected to the control device, wherein the control device is set up to carry out a method for actively discharging an electrical energy storage device using the electrical circuit arrangement, which includes the at least one half bridge comprising the two switching elements, wherein the half bridge is connected in parallel with the energy storage device and wherein the switching elements each have a switchable section, the electrical resistance of which can be set in a transmission mode of the switching element by a control voltage of the switching element, the method comprising:

the level of the control voltages of the switchable sections of the switching elements in transmission mode and/or the ratio between a switched-on duration in which the switchable sections of the switching elements are operated in transmission mode during the discharge, and a switched-off duration in which the switchable sections of the switching elements are operated in a blocking mode during the discharge can be set as a function of a discharge current specification describing the level of a discharge current of the energy storage device.

17. An electrical circuit device, comprising:
a control device according to claim 16,
the electrical energy storage device, and
the electrical circuit arrangement with the at least one half bridge comprising the two switching elements, wherein the half bridge is connected in parallel with the energy storage device and the switching elements respectively having a switchable section the resistance of which can be set by a control voltage of the switching element.

18. A motor vehicle comprising an electrical circuit device according to claim 17.

* * * * *